United States Patent
Dundas et al.

(10) Patent No.: US 9,704,158 B2
(45) Date of Patent: Jul. 11, 2017

(54) SERVICE ASSISTED RELIABLE TRANSACTION SIGNING

(71) Applicant: Symantec, Inc., Mountain View, CA (US)

(72) Inventors: Alan Dundas, Mountain View, CA (US); Oanh Hoang, Mountain View, CA (US); Eirik Herskedal, Mountain View, CA (US)

(73) Assignee: Symantec Corporation, Mountain View, CA (US)

( * ) Notice: Subject to any disclaimer, the term of this patent is extended or adjusted under 35 U.S.C. 154(b) by 748 days.

(21) Appl. No.: 13/843,664

(22) Filed: Mar. 15, 2013

(65) Prior Publication Data

US 2014/0250008 A1  Sep. 4, 2014

Related U.S. Application Data

(60) Provisional application No. 61/771,578, filed on Mar. 1, 2013.

(51) Int. Cl.
*G06Q 20/00* (2012.01)
*G06Q 20/38* (2012.01)
*G06Q 20/40* (2012.01)

(52) U.S. Cl.
CPC ......... *G06Q 20/3825* (2013.01); *G06Q 20/40* (2013.01)

(58) Field of Classification Search
CPC .... G06Q 20/401; G06Q 20/382; G06Q 30/06; G06Q 20/04; G06Q 20/02
See application file for complete search history.

(56) References Cited

U.S. PATENT DOCUMENTS

| 7,509,498 | B2 * | 3/2009 | Brickell | H04L 9/3247 |
| | | | | 713/157 |
| 2005/0177521 | A1 * | 8/2005 | Crosson Smith | G06Q 20/10 |
| | | | | 705/67 |

* cited by examiner

*Primary Examiner* — Michelle L Le
(74) *Attorney, Agent, or Firm* — Patterson + Sheridan, LLP (57) ABSTRACT

Techniques are disclosed for authenticating transactions conducted over computer networks, e.g., online banking transactions or other transactions performed by a financial institution at a customer's request. After receiving a transaction request (and associated transaction details), the transaction signing service signs the transaction data and sends the resulting blob to the user requesting the transaction. After being transmitted to the user, the signed transaction data itself is then signed using PKI credentials of the user, which then returns the twice-signed bundle to the financial institution. Rather than rely on the cryptographic signature of the client, the financial intuition (or other replying party) validates that the transaction data signed using its own highly trusted key has not been altered prior to being signed and returned by the client.

18 Claims, 6 Drawing Sheets

SERVICE ASSISTED RELIABLE TRANSACTION SIGNING

CROSS REFERENCE TO RELATED APPLICATIONS

This application claims benefit of U.S. provisional patent application Ser. No. 61/771,578, filed Mar. 1, 2013, which is herein incorporated by reference.

BACKGROUND

Field

Embodiments of the invention generally relate to techniques for authenticating transactions conducted over computer networks, e.g., online banking transactions. More specifically, embodiments of the invention provide a signing mechanism that protects against man-in-the-middle attacks and some malware attacks.

Description of the Related Art

Network based transactions have become commonplace and it is routine for financial institutions to offer customers web-based access to deposit and investment accounts. For example, bank customers routinely use web-based systems to transfer money from one account to another, to access online bill pay services, or to perform a variety of other transactions. Similarly, online brokerages allow customers to purchase and sell stocks, bonds, and other securities using any networked computer. Other common online transactions include posting payments to utility or loan accounts and purchasing goods or services.

In each of these cases, transaction security is a well-known and serious concern, particularly for financial institutions that allow customers to transfer funds from one account to another using web-based systems. Accordingly, a variety of security techniques are used to help ensure that only authorized users can access a given account. For example, a variety of cryptographic techniques have been developed that to improve security and provide more reliable user authentication.

However, simply assigning customers with a username and password, and even using cryptographic protocols (e.g., a public key infrastructure (PKI) and digital certificates) to verify customer identify is insufficient to prevent a variety of forms of online fraud. That is, while these techniques can be used by a financial institution to verify customer identify, they leave a user's account vulnerable to other forms of attack. For example, malicious individuals can create websites that masquerade as a legitimate bank site in order to perform a "man-in-the middle" attack. In such an attack, when the user accesses the malicious website, it presents itself to the user as the legitimate bank site, and obtains any access credentials supplied the user. The attacker then uses the credentials to access the user's account with the financial institution using the legitimate credentials. Typically, the "man-in-the-middle" attacker simply passes logon messages to the bank and passes messages from the bank back to the user. This allows the "man-in-the-middle" to alter transaction details without the legitimate user knowing that something is being changed. That is, once an attacker has intercepted a legitimate transaction request, the attacker then changes the details of that transaction (e.g., transferring money from one account to another) in order to perform a different one (e.g., stealing funds from the account). Such fraud can be very difficult to address because the actual funds transfer was initiated with the users legitimate credentials.

Another similar attack is sometimes referred to as a "man-in-the-browser." In such an attack, malware installed on a user's browser recognizes when a user attempts to access an account with a financial institution. When this occurs, the malware allows the user to conduct a transaction, but changes details to transfer funds to the attacker. At the same time, the user is presented with details of the legitimate transaction, i.e., the amounts and fund recipients are shown to be what the user has requested, while the actual recipient and or fund amount is changed.

SUMMARY

Embodiments presented herein include a method for validating transactions conducted over computer networks. This method includes receiving, over a network connection, a request from a client device to perform a transaction. The request specifies one or more transaction details characterizing the requested transaction. This method may also include generating, by operation of a processor, a data structure storing the transaction details, generating a first digital signature over the data structure, and sending the signed data structure to the requesting client. This method may also include receiving, from the client device, the signed data structure and validating the signed data structure received from the client device against the first digital signature. If the first digital signature is valid, the requested transaction is then performed.

In a particular embodiment, the signed data structure received from the client device includes a second digital signature generated over the signed data structure. If present, the method may further include. prior to performing the requested transaction, validating the second digital signature over the signed data structure.

Other embodiments include, without limitation, a computer-readable medium that includes instructions that enable a processing unit to implement one or more aspects of the disclosed methods as well as a system having a processor, memory, and application programs configured to implement one or more aspects of the disclosed methods.

BRIEF DESCRIPTION OF THE DRAWINGS

So that the manner in which the above recited aspects are attained and can be understood in detail, a more particular description of embodiments of the invention, briefly summarized above, may be had by reference to the appended drawings.

It is to be noted, however, that the appended drawings illustrate only typical embodiments of this invention and are therefore not to be considered limiting of its scope, for the invention may admit to other equally effective embodiments.

DETAILED DESCRIPTION

Embodiments of the invention presented herein provide techniques for authenticating transactions conducted over computer networks, e.g., online banking or other transactions with a financial institution. These techniques include a signing mechanism that protects against both man-in-the-middle attacks as well as some malware attacks that could otherwise compromise online transactions. In one embodiment, a transaction signing service signs transaction data presented to a user. After being transmitted to the user, the signed transaction data itself is then signed using PKI credentials of the user, which then returns the twice-signed bundle to the financial institution. Rather than rely on the cryptographic signature of the client, the financial intuition (or other replying party) validates that the transaction data signed using its own highly trusted key has not been altered prior to being signed and returned by the client.

More generally, embodiments presented herein provide a mutual authentication mechanism between a signer and the signature recipient (replying party that performs a requested transaction). This authentication mechanism provides reliable transaction signing without being vulnerable to man-in-the middle attacks. In one embodiment, a signature recipient (e.g., bank or other financial institution) sends verifiable (i.e., signed) data to the signer (customer), who then signs the signed data. That is, prior to sending a request to a client to sign (accept or authorize) a transaction, a transaction data structure is generated and signed using a strong well protected key held by the party that carries out the requested transaction (e.g., the bank that transfers funds). The details in the signed transaction can be used by the client to validate the transaction data, display text representing the terms of the requested transaction, and select a desired certificate for use in signing the transaction a second time. After the client accepts the transaction, a key associated with the selected certificate places a second signature around the transaction data structure and returns this to the signature recipient (i.e., returns it to the bank or financial institution).

The signed data is then compared at the signature recipient with what was sent for signing, ensuring that the data has not been modified. The bank can then validate both signatures to determine that the intended transaction was not modified and was accepted by the desired end user. Further, the signed data structure can be archived for longer term auditing purposes.

By verifying that the transaction data sent to the client for signing matches the data returned by the client, the signature recipient (e.g., the bank or other financial institution) is relying on its own signature to validate the transaction. That is, the bank relies on its own signature of the transaction to confirm that the transaction that will be performed matches what was presented to the client.

In the following, reference is made to embodiments of the invention. However, the invention is not limited to any specific described embodiments. Instead, any combination of the following features and elements, whether related to different embodiments or not, is contemplated to implement and practice the invention. Furthermore, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples a computer readable storage medium include: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the current context, a computer readable storage medium may be any tangible medium that can contain, or store a program for use by or in connection with an instruction execution system, apparatus or device.

The flowchart and block diagrams in the Figures illustrate the architecture, functionality and operation of possible implementations of systems, methods and computer program products according to various embodiments of the present invention. In this regard, each block in the flowchart or block diagrams may represent a module, segment or portion of code, which comprises one or more executable instructions for implementing the specified logical function(s). In some alternative implementations the functions noted in the block may occur out of the order noted in the figures. For example, two blocks shown in succession may, in fact, be executed substantially concurrently, or the blocks may sometimes be executed in the reverse order, depending upon the functionality involved. Each block of the block diagrams and/or flowchart illustrations, and combinations of blocks in the block diagrams and/or flowchart illustrations can be implemented by special-purpose hardware-based systems that perform the specified functions or acts, or combinations of special purpose hardware and computer instructions.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources. A user can access any of the resources that reside in the cloud at any time, and from anywhere across the Internet. In context of the present invention, a cloud based application may be configured to provide a transaction signing service on behalf of a transaction provider, e.g., on behalf of a bank that wants to validate transactions initiated by users. Also note, while described herein using a funds transfer performed on a financial institution web-site as a reference example of a network transaction, one of ordinary skill in the art will recognize that embodiments of the invention may be adapted for use by a broad variety of enterprises to reliably validate the details for transactions conducted over computer networks.

Figure 1:
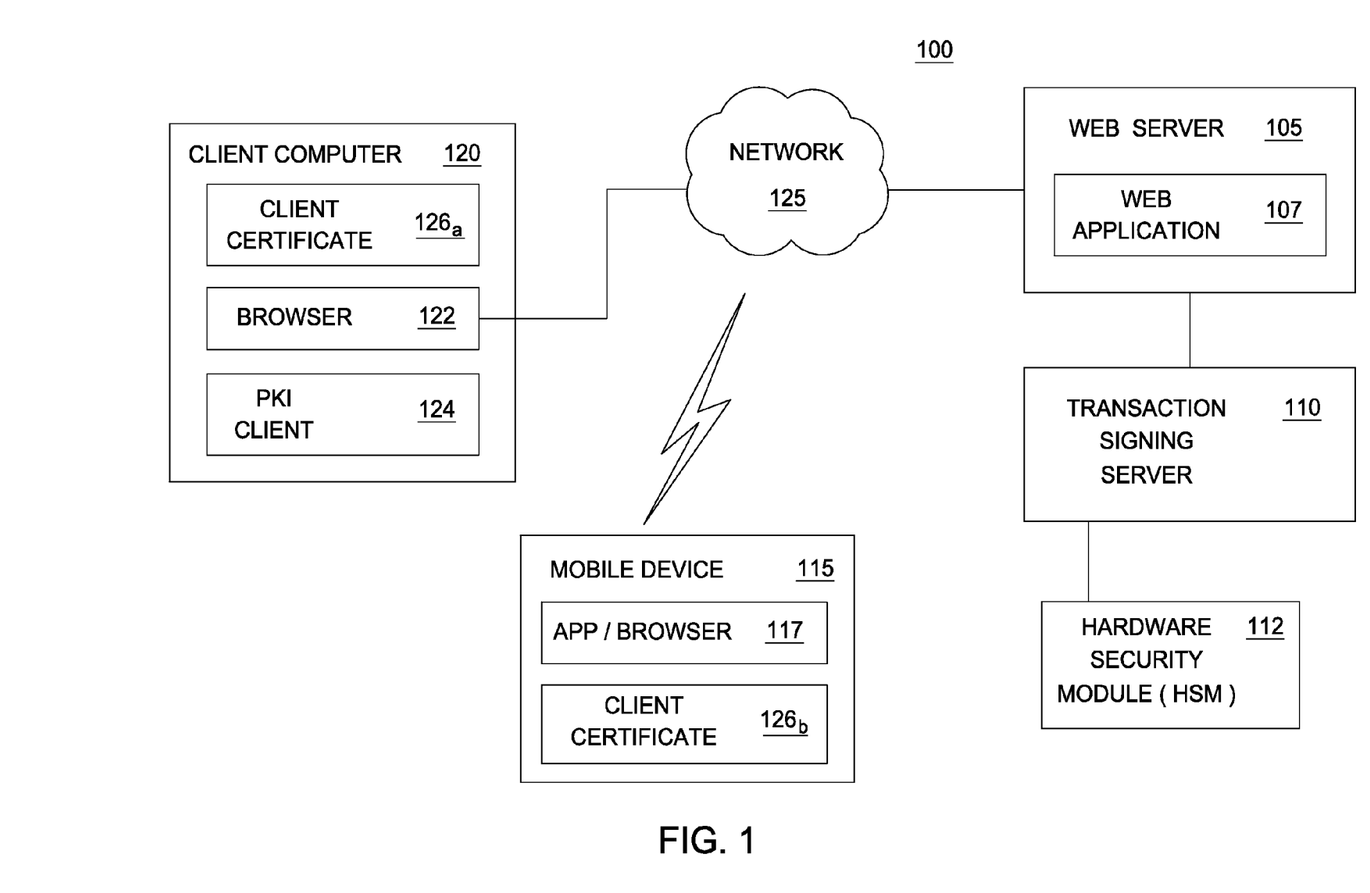
FIG. 1 illustrates an example computing environment, according to one embodiment.

FIG. 1 illustrates an example computing environment 100, according to one embodiment. The computing environment 100 allows a financial institution (or other relying party) to perform transactions via a web-application, as requested by a client, in a manner that protects against a man-in-the-middle and other malware attacks. As shown, the computing environment 100 includes a server computer 105 hosting a web application 107. For example, web application 107 may provide an online banking site that allows bank account holders to engage in funds transfers and online bill paying transactions. The web server computer 105 may be a physical computing system in a data center controlled by the financial institution or may be a virtual computing instance executing within a computing cloud. In any event, the computing system 105 hosts a web application 107 (also referred to as a relying application) accessed by clients using computing systems 115 and 120 to initiate transactions. In one embodiment, the web application 107 uses the transaction signing server 110 to initially protect and then perform a validation mechanism for transactions exchanged with client systems 115 and 120.

Like web server 105, the transaction signing server 110 may be a computing system in a data center controlled by the financial institution. That is, the transaction signing server 110 may comprise an in-premise computing server (whether as a physical or virtual machine instance) under the direct control of the financial institution (or other replying party). Alternatively, however, the transaction signing server 110 could be a computing system hosted by a third-party provider (relative to the financial institution), e.g., a virtualized system hosted by a computing cloud. However, to improve the reliability of transactions signed by the transaction server 110, it is generally contemplated that the transaction signing server 110 is a computing system controlled by the financial institution or hosted by a trusted provider.

Illustratively, the transaction signing server 110 includes a hardware security module (HSM) 112. As known, an HSM 112 provides a tamper resistant store for cryptographic keys and a computing device that can carry out cryptographic operations with the stored keys. Accordingly, HSM 112 may generally be configured to perform message hashing, signing, validation and other cryptographic operations. Note, while transaction signing is described herein as being performed using a private key stored on the HSM, one of skill in the art will recognize that such a private key stored on the HSM may itself be used to sign other keys in a certificate chain and that such other keys may then be used to actually digitally sign transactions.

Client computer 120 generally corresponds to any computing system, e.g., laptop, desktop, game console, etc., configured with a web-browser 122 used to access web application 107 over network 125 (e.g., over the Internet). Accordingly, client computer 120 may include a CPU, memory, storage, display, user input devices (e.g., keyboard and mouse) and web-browsing software (browser 122). As shown, the client computer 120 also includes a PKI client 124. In one embodiment, the PKI Client 124 provides a software component residing on client computer 120 configured to access a client certificate $126_a$ and corresponding private key store (whether software or hardware based). The PKI client 124 may be used to perform cryptographic operations, e.g., message hashing, signing, validation and other cryptographic operations.

Figure 6:
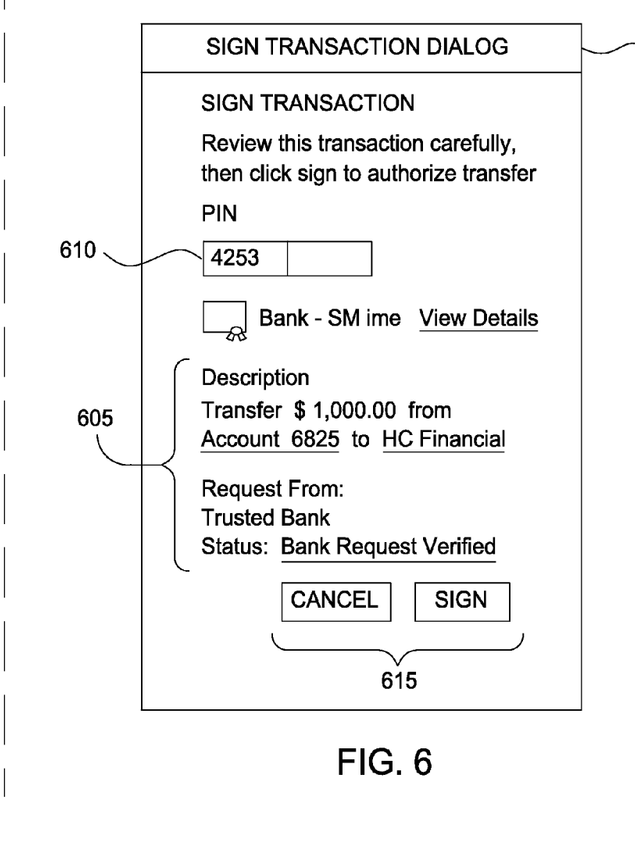
FIG. 6 illustrates an example interface 600 presenting transaction details on a client system, according to one embodiment.

In one embodiment, the PKI Client 124 may be invoked through JavaScript functions supplied to the browser 122 by the web application 107. When invoked, the PKI Client 124 may display a dialog presenting the user with transaction data associated with a given transaction as well as allow the user to sign/accept transaction data in order to indicate a transaction represented by the transaction data is in fact authorized by that user. An example of such a dialog is shown in FIG. 6, discussed in greater detail below.

Mobile device 115 generally corresponds to a handheld computing device, e.g., a mobile telephone or tablet that can execute an "app" or web browser 117. Like browser 122, the "app" 117 may be used to initiate transactions with the web application 107 over network 125. The client certificate $126_b$ and associated private key are used to accept/sign transaction data for transactions initiated using the "app" or web browser 117 (and web-application 107).

In one embodiment, when a client (via browser 122 or app/browser 117) initiates a transaction, the web application 107 generates a data structure storing the details of a requested transaction (e.g., a PKCS #7 blob). The transaction signing service 110 (and HSM 112) then generates a cryptographic signature of this data structure. In one embodiment, the data structure also stores a list of uniform resource locators (URLs) authorized to receive transaction requests. That is, the data structure may store a set of network addresses authorized to host the web application 107.

The resulting signed data structure (e.g., the signed PKCS #7 blob) is passed to the requesting client. The client then presents the proposed transaction details to the client and prompts for the user to accept/verify the terms of the requested transaction. In turn, functions provided by the PKI client 124 are invoked (e.g., via JavaScript executed on the browser 122) to wrap the signed data structure received from web-application 107 with a digital signature associated with the client (e.g., using a private key associated with a certificate issued to a bank customer). The browser 122 returns the client-signed, signed data structure to the web application 107. Provided both the signature of the client and the signature of the signing service are validated by the transaction signing server 110 (indicating that the transaction details reflected in the signed data structure were not modified), then the web application 107 performs the requested transaction. Additionally, the data structure and digital signatures generated by the signing service 110 and PKI client 124 may be stored by the web application 107 to later prove, reliably, that the details of the transaction performed by the web-application 107 matches the details presented to the user via browser 122 (on client computer 120) or app/browser 117 (on mobile device 115).

Figure 2:
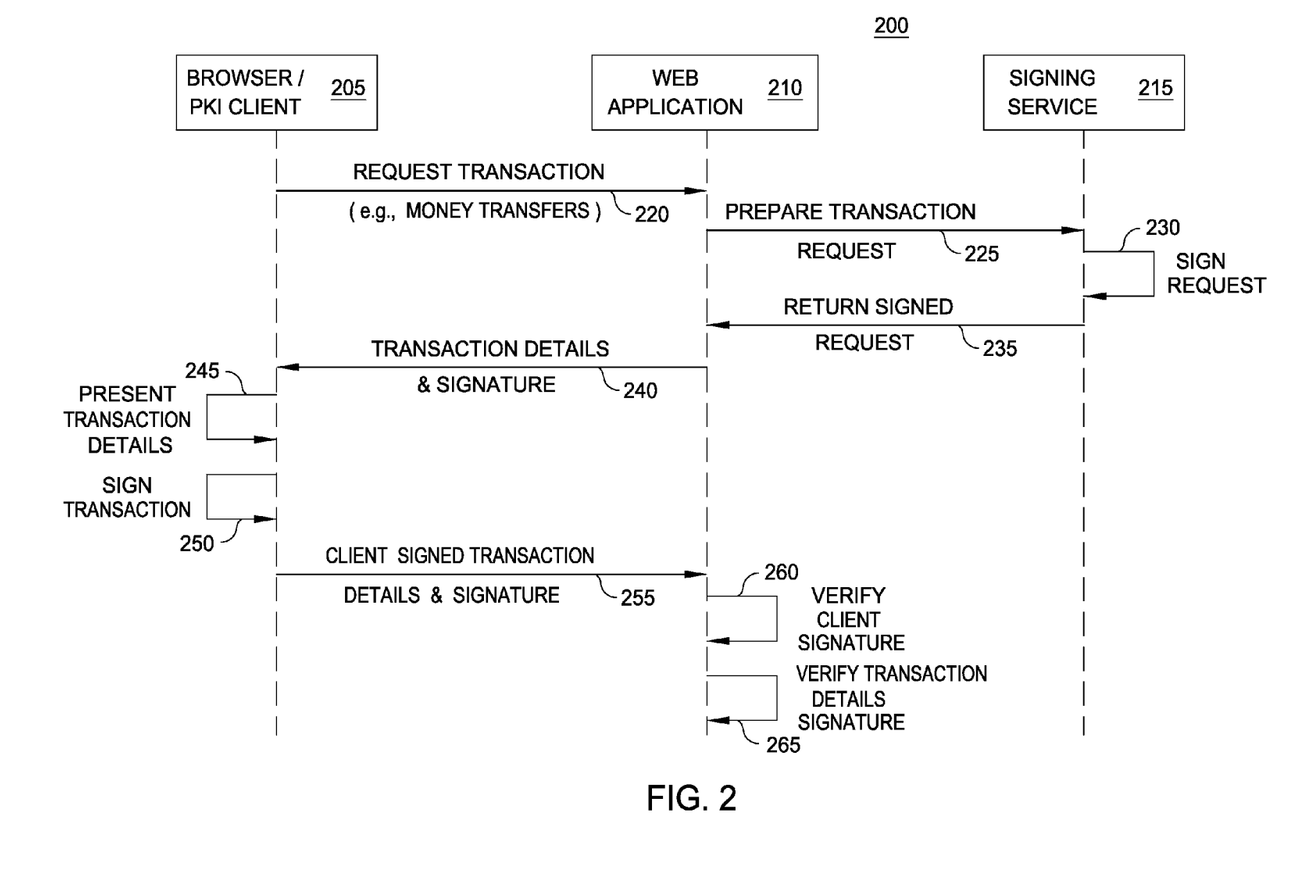
FIG. 2 illustrates a sequence diagram for performing secure transaction signing for transactions conducted over computer networks, according to one embodiment.

FIG. 2 illustrates a sequence diagram 200 for validating and authorizing transactions conducted over computer networks, according to one embodiment. As shown, a browser 205 executing a PKI client, a web-application 210, and a transaction signing service 215 interact to perform transactions that are protected from man-in-the-middle and other malware attacks. At 220, a user initiates a transaction. For example, a user may access a financial institution website with browser 205 and logon using a set of credentials, e.g., by supplying a username and password. Once logged on, the PKI client executed within browser 205 renders an interface to the web-application 210 used to perform transactions. Assume the user requests to transfer funds from one financial account to another, e.g., Alice requests to transfer $1000 from her account to Bob's. At 225, the web-application 210 prepares a transaction request to submit to the signing service 215. For example, the web-application 210 may generate a data structure reflecting the details of the requested transaction, such as an account "Alice," an amount "$1000," and a recipient account "Bob." In one embodiment, the details of the requested transaction may provide a PKCS #7 blob which encodes the transaction details in a text format to be rendered by PKI client on browser 205 as well as encodes the transaction details in a binary format used by the web-application 210 to perform the requested transaction.

At 230, the transaction signing service 215 signs the transaction request generated by the web-application. As noted, the key used to sign the request may be a key stored on a HSM controlled by the financial institution (or private key named in a certificate that chains to the HSM key). Thus, the financial institution may have a high-degree of trust in signatures created using the HSM key. At 235, the signing service 215 returns the signed request to the web application. And at 240, the web-application 210 returns the signed data structure with the transaction details to the PKI Client via the browser 205.

At 245, the PKI Client via the browser 205 retrieves the encoded transaction details from the data structure and renders a display of the transaction details to the client. In addition, the PKI Client via the browser 205 may validate the signature associated with the signed data structure. Doing so allows the user to verify that the transaction details have not been altered once signed by the transaction signing service 215 as well as verify that the transaction details came from the financial intuition. Further, in one embodiment an authorized URL (or regular expression for matching to a URL) may be included as part of the signed data structure payload. Doing so provides a mechanism for the user to verify that the signed data structure was received from an authorized source (i.e., that the web-application is hosted by an authorized URL).

After reviewing the transaction details rendered by PKI Client via the browser 205, the user approves/accepts the details of the transaction. At 250, once approved, the PKI Client signs the signed data structure. That is, the PKI client wraps the signed data structure with a second signature. For example, assume the financial institution has provided "Alice" with an X.509 digital certificate. In such a case, the PKI Client access the private key associated with this certificate and uses it to generate a signature over the signed data structure. In one embodiment, the PKI Client treats the signed data structure as a PKCS #7 blob. Additionally, the PKI Client executed within browser 205 can filter certificates in a local certificate store on the client to identify one to be used for the signature operation. For an X.509 certificate, the mechanism can filter on a variety of certificate attributes, including:
   CN: Certificate Common Name from subject Email
   Email: From subject UID or from subjectAltName
   Certificate UID: From subject rfc822Name
   UPN: User principal name from subjectAltName
   DNSName: DNS identifier from subjectAltName
   Profile OID: Certificate profile identifier Filtering for the correct certificate may simplify the overall user experience and avoid the complexity of having the user select the correct certificate manually. After the user approves the transaction, at 255, the PKI Client executed within browser 205 returns a signed PKCS #7 blob to the web-application 210. Again, note the signed blob wraps the transaction details and the signature of the transaction details generated by the signing service 215 with a second signature, generating a wrapped client signed transaction.

At 260, the web-application 210 verifies the client signature generated for the PKCS #7 blob created by the PKI Client. Continuing with the example of a funds transfer from "Alice" to "Bob," the client signature allows the financial intuition to verify that "Alice" signed the request using the private key associated with the X.509 certificate issued to "Alice" by the financial institution. In addition, at 265, the web-application 210 validates the underlying signature generated by the signing service at 230. That is, the web-application 210 verifies that the transaction data sent to the browser 205 has not been modified. Further, validating the signature sent to the client with the transaction details allows the financial institution to rely on the signature created by the highly-trusted keys stored by the HSM (or keys that named in a certificate chain derived from the keys in the HSM); rather than relying on the signature of the client. This approach can help prevent a man-in-the-middle attack from intercepting and modifying a transaction request sent to a client well as help prevent other forms of malware attacks such as a man-in-the-browser attack (or at least make such attacks much more difficult to perform successfully).

Note, the sequence diagram 200 shown in FIG. 2 illustrates an example of a PKI client executed within a web browser. Such a PKI Client may be invoked using JavaScript functions supplied to the web browser by the web application. In another embodiment, an application, or "app" running on a mobile device may interact with a web application and transaction signing service in a similar manner. In such a case, the app may perform the functions of the PKI client as well as request and post data to the web application to conduct a transaction.

Figure 3:
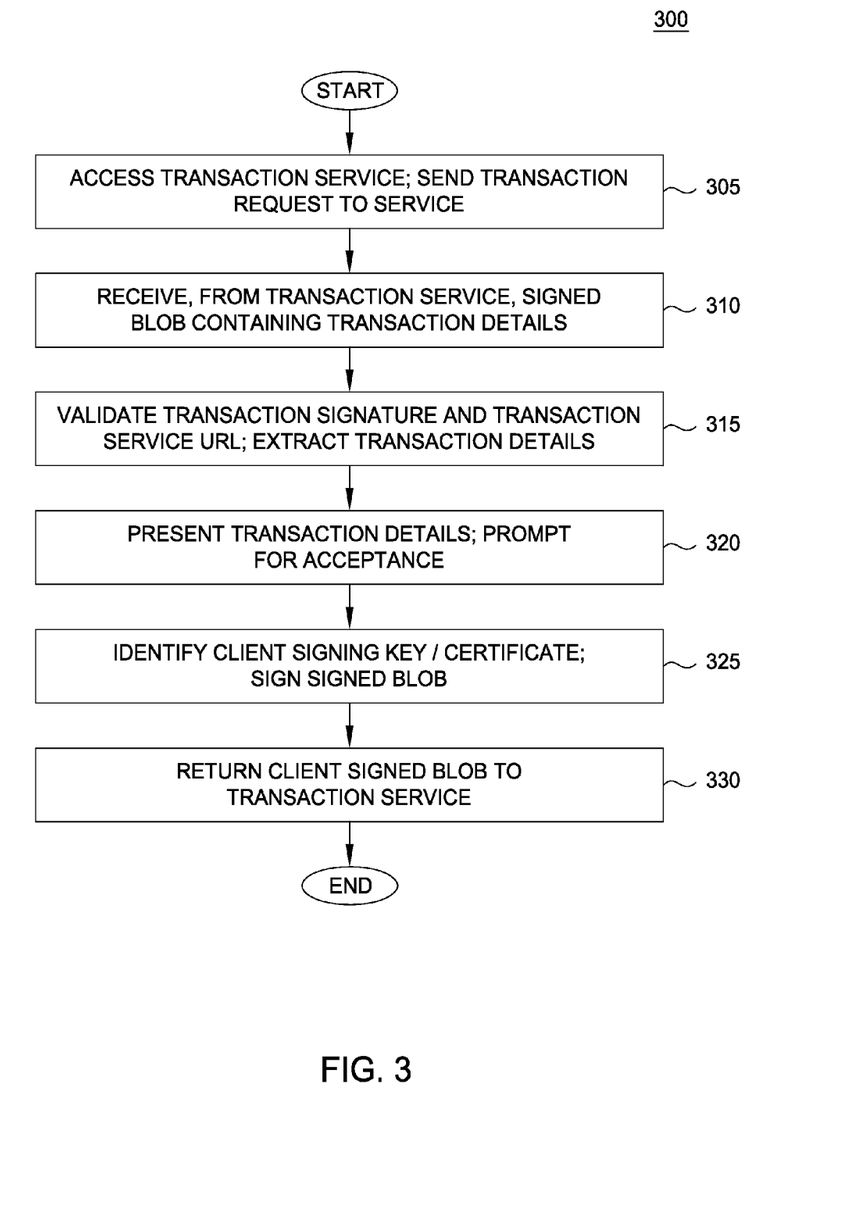
FIG. 3 shows a method illustrating the transaction signing process of FIG. 2 from a client perspective, according to one embodiment.

FIG. 3 shows a method 300 illustrating the transaction signing process of FIG. 2 from a client perspective, according to one embodiment. As shown, the method 300 begins at step 305 where a user accesses a transaction service and requests to perform a transaction using the service. Again, for example, a user with an account at a financial institution may logon to the institution's website and initiate a funds transfer using a web-application hosted by the institution. At step 310, the client, receives, from the transaction service a signed blob which includes the details of the requested transaction. The blob may be digitally signed by a well-protected key controlled by the financial institution, e.g., key stored in an HSM on a system in the institution's data center.

At step 315, the PKI client validates the signature of the transaction created by the signing service. In one embodiment, the PKI client may also verify that the URL used to access the web-application matches an authorized URL included in the signed transaction details. In addition, the browser may extract the transaction details included in the signed blob. And at step 320, the browser (or the PKI client) may present the transaction details to the user and prompt the user to accept/verify the transaction details. Again, for a funds transfer, such a display could present a source account, an amount, and a recipient account for the funds transfer. The browser then prompts the user to accept the transaction or otherwise confirm that the transaction should be performed.

Assuming this occurs, at step 325, the PKI client identifies a key used by the client to sign the transaction. For example, the PKI client may use the private key associated with the X.509 certificate issued to the user by the financial institution that will perform the funds transfer associated with the transaction being verified. Once identified, the PKI client wraps the signed blob received at step 310 with a second digital signature. That is, the PKI component creates a digital signature with the key identified at step 325 and uses it to sign the transaction details and digital signature generated by the transaction signing service. Once signed, the resulting signed blob is returned to the web-application, in order for the requested transaction to be performed.

Figure 4:
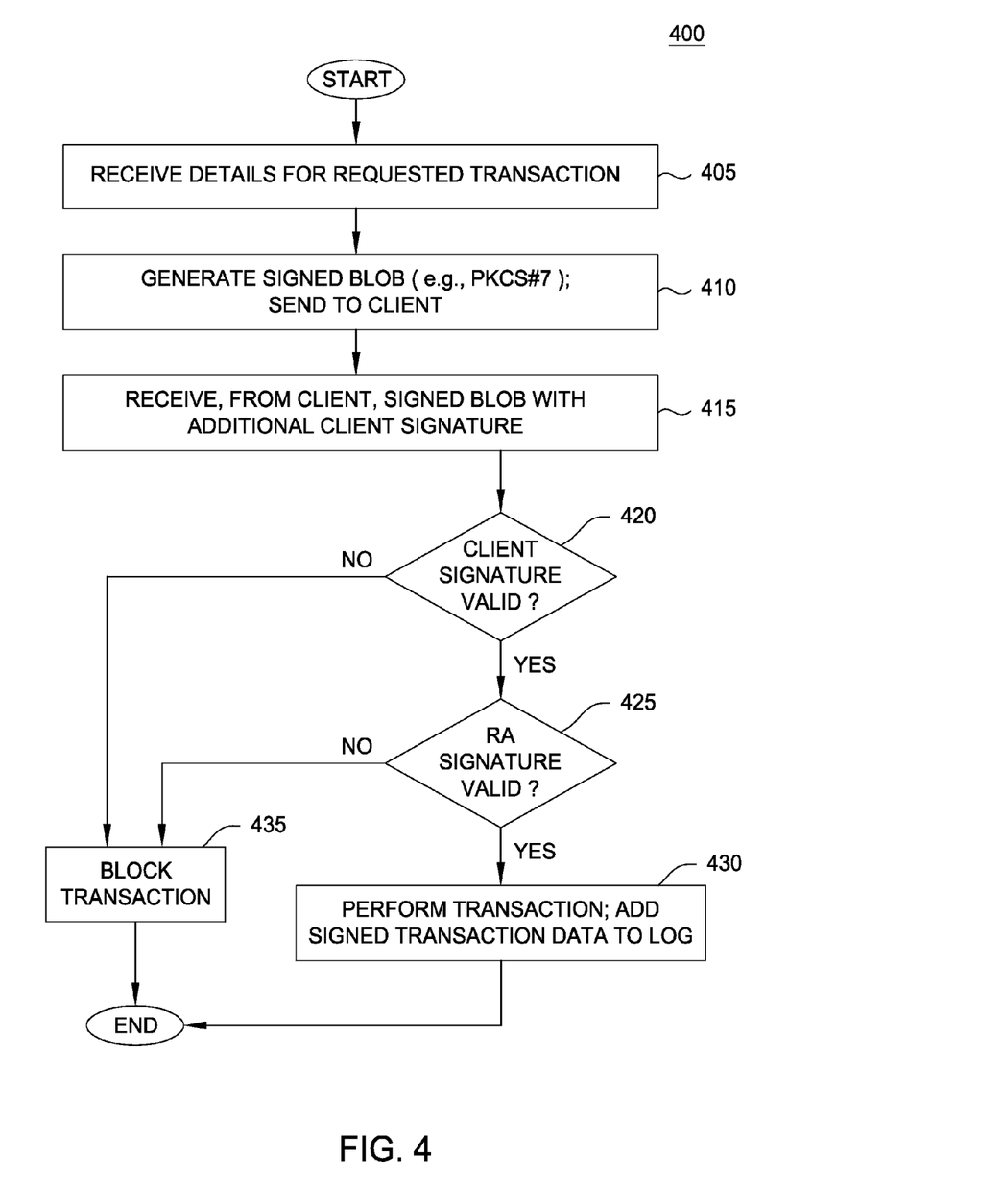
FIG. 4 shows a method illustrating the transaction signing process of FIG. 2 from a server perspective, according to one embodiment.

FIG. 4 shows a method 400 illustrating the transaction signing process of FIG. 2 from a server perspective, according to one embodiment. As shown, the method 400 begins at step 405, where the web-application receives details for a requested transaction. At step 410, the web-application, via the transaction signing service, generates a digital signature over the transaction details. The resulting signed blob (e.g., a PKCS #7 blob) is returned to the client requesting the underlying transaction. In response, the client verifies the transaction details and wraps the signed blob with a digital signature associated with the client requesting the transaction. The wrapped client signed transaction is then returned to the web application. That is, at step 415, the signed transaction blob sent to the client (at step 410) is received back from the client wrapped with an additional digital signature.

At step 420, the web-application validates the client signature signed the signed blob sent to the client. That is, the web-application verifies that the signed blob was itself signed using a key associated with the user requesting the underlying transaction. For example, the web-application may verify that the signed blob was additionally signed using the private key associated with an X.509 certificate issued by the financial institution to the user requesting the underlying transaction. If valid, at step 425, the web-application determines whether the registration authority (RA) signature signing the transaction details sent to the client is valid. That is, the web-application confirms that the signed transaction blob received from the client has not been modified and, therefore, that the transaction details presented to the client match the transaction details requested by the client. Provided the signatures are valid, the web-application then performs the requested transaction (step 430) and creates the appropriate log records storing the blob and signatures. Otherwise, at step 435, the web-application declines to perform the requested transaction.

Figure 5:
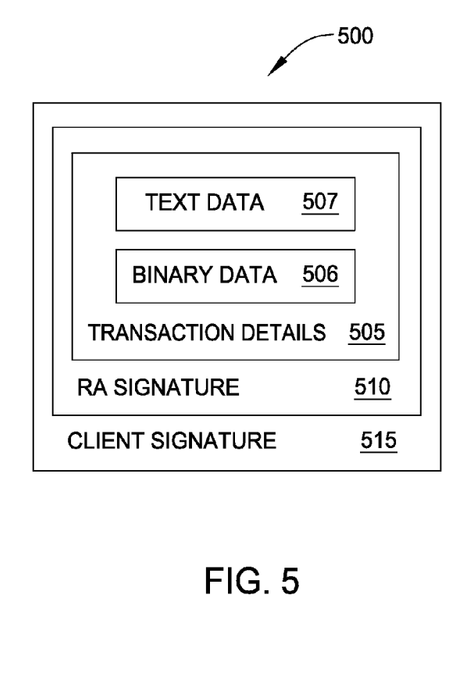
FIG. 5 illustrates an example data structure created during the transaction signing process shown in FIGS. 3-5, according to one embodiment.

FIG. 5 illustrates an example data structure 500 generated during the transaction signing process shown in FIGS. 3-5, according to one embodiment. As shown, the data structure 500 includes transaction details 505, RA signature 510, and client signature 515. Illustratively, the transaction details include text data 507 and binary data 506. In one embodiment, the text data 506 provides a text-based encoding of the requested transaction details to present to user. For example, the data may be encoded as HTML or XML, which can be rendered by a browser. The binary data 506 provides an encoding of the requested transaction manipulated by the web-application (or other systems) to actually perform the transaction. The RA signature 510 corresponds to the signature generated by the transaction signing service, i.e., to the signature generated using the highly trusted and secure key held by the financial institution (or other relying party). The RA signature 510 and transaction details 505 provide the signed blob sent to the client (and received back) by the web-application. The client signature 515 wraps the RA signature 510 and transaction details 505, i.e., over the signed blob sent to the client.

FIG. 6 illustrates an example interface 600 presenting transaction details on a client system, according to one embodiment. As shown, the dialog 600 presents the details 605 associated with a transaction initiated by a client. In this case, a funds transfer of $1000 from one account "account 6825" to another "HC Financial." In addition, the dialog prompts the user for a PIN 610 used to access a private key used to sign the transaction details. Note, the use of a PIN (or other value) to protect a private key is optional. Once entered the user can either sign the transaction data or cancel, using button 615. If the user signs the transaction details, then the client signature 515 of FIG. 5 is generated and the resulting data structured 500 is returned to the web-application and the underlying transaction, as reflected in transaction details 505, is performed.

Figure 7:
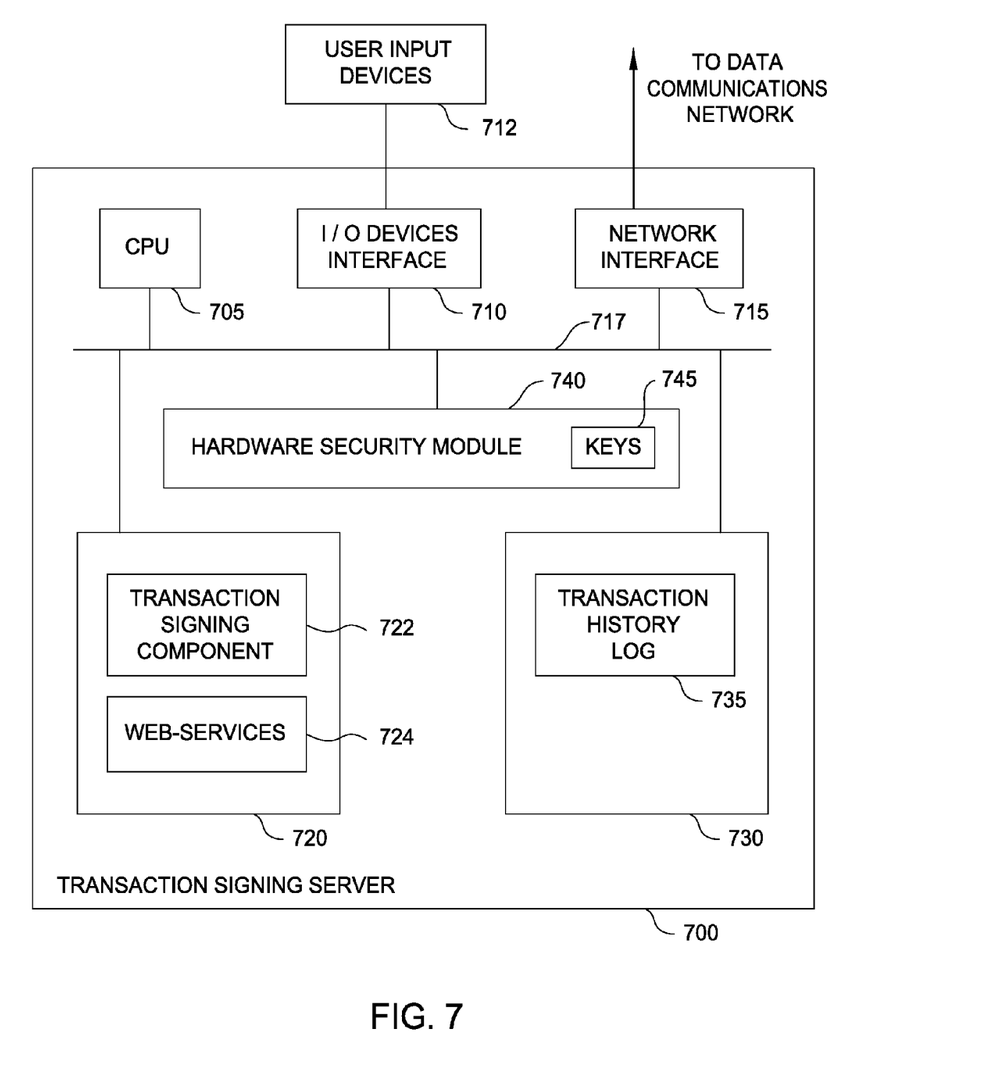
FIG. 7 illustrates an example computing system configured with a hardware security module (HSM) and a transaction signing service, according to one embodiment.

FIG. 7 illustrates an example computing system 700 configured with a hardware security module (HSM) 740 and a transaction signing service 722, according to one embodiment. As shown, the computing system 700 includes, without limitation, a central processing unit (CPU) 705, a network interface 710, a network interface 715, a memory 720, and storage 730, each connected to a bus 717. The computing system 700 may also include an I/O device interface 710 connecting user input devices 712 (e.g., keyboard, display and mouse devices) to the computing system 700. Further, in context of this disclosure, the computing elements shown in computing system 700 may correspond to a physical computing system or to a virtual machine image executed by a physical host in a financial institution data center.

The CPU 705 retrieves and executes programming instructions stored in the memory 720 as well as stores and retrieves application data residing in the memory 730. The interconnect 717 is used to transmit programming instructions and application data between the CPU 705, I/O devices interface 710, storage 730, network interface 715, and memory 720. Note, CPU 705 is included to be representative of a single CPU, multiple CPUs, a single CPU having multiple processing cores, and the like. And the memory 720 is generally included to be representative of a random access memory. The storage 730 may be a disk drive storage device. Although shown as a single unit, the storage 730 may be a combination of fixed and/or removable storage devices, such as fixed disc drives, removable memory cards, or optical storage, network attached storage (NAS), or a storage area-network (SAN).

Illustratively, the memory 720 includes a transaction signing component 722 and web services 724. And the storage 730 includes a transaction history log 735. The web-services component 724 generally provides one or more software applications configured to interact with a web-application to provide transaction signing for transactions requested via the web-application. For example, the web-services component 724 may receive a data structure storing transaction details for a requested transaction. In response, the web-services component may request the transaction signing component 722 interact with a hardware security module 740 to generate a digital signature over the transaction details using keys 745, in the manner described above.

As described, embodiments of the invention provide techniques for authenticating transactions conducted over computer networks, e.g., online banking transactions or other transactions performed by a financial institution at a customer's request. After receiving a transaction request (and associated transaction details), the transaction signing service signs the transaction data and sends the resulting blob to the user requesting the transaction. After being transmitted to the user, the signed transaction data itself is signed with a digital signature generated using the PKI credentials of the user, which then returns the resulting bundle to the financial institution. That is, after the user has accepted the transaction, the private key associated with the user's PKi credentials is used to wrap a second signature around the current transaction, resulting in a wrapped client signed transaction.

The wrapped client signed transaction is then returned to the entity performing the transaction specified in the wrapped client signed transaction. Rather than rely on the cryptographic signature of the client, the financial intuition (or other replying party) validates that the transaction data signed using its own highly trusted key has not been altered prior to being signed and returned by the client.

While the foregoing is directed to embodiments of the present invention, other and further embodiments of the invention may be devised without departing from the basic scope thereof, and the scope thereof is determined by the claims that follow.

What is claimed is:

1. A method for validating transactions conducted over computer networks, the method comprising:
   receiving, over a network connection, by an application, a request from a client device to perform a transaction, wherein the request specifies one or more transaction details characterizing the requested transaction;
   generating, by operation of a processor executing the application, a data structure storing the transaction details;
   generating a first digital signature over the data structure;
   sending the signed data structure to the requesting client device;
   receiving, from the client device, the signed data structure, wherein the signed data structure received from the client device is wrapped with a second digital signature and wherein the second digital signature is generated by the client device;
   validating the data structure, of the signed data structure received from the client device, against the first digital signature;
   validating the signed data structure received from the client device against the second digital signature; and
   upon determining the first digital signature and second digital signature are valid, performing the requested transaction.

2. The method of claim 1, wherein the client device is configured to:
   receive the signed data structure;
   present the one or more transaction details; and
   prompt the user to accept the transaction details by authorizing the second digital signature to be generated over the signed data structure.

3. The method of claim 1, wherein the data structure further stores a set of network addresses authorized to host a web-application receiving the request from the client device.

4. The method of claim 1, further comprising, storing the data structure and first digital signature in a transaction history log.

5. The method of claim 1, wherein the requested transaction is a funds transfer and wherein the one or more transaction details include at least a source account associated with the client, a recipient account for the funds transfer and an amount for the funds transfer.

6. The method of claim 1, wherein the data structure is a PKCS blob.

7. A non-transitory computer-readable storage medium storing instructions, which, when executed on a processor, performs an operation for validating transactions conducted over computer networks, the operation comprising:
   receiving, over a network connection, a request from a client device to perform a transaction, wherein the request specifies one or more transaction details characterizing the requested transaction;
   generating, by operation of a processor, a data structure storing the transaction details;
   generating a first digital signature over the data structure;
   sending the signed data structure to the requesting client device;
   receiving, from the client device, the signed data structure, wherein the signed data structure received from the client device is wrapped with a second digital signature and wherein the second digital signature is generated by the client device;
   validating the data structure, of the signed data structure received from the client device, against the first digital signature;
   validating the signed data structure received from the client device against the second digital signature; and
   upon determining the first digital signature and second digital signature are valid, performing the requested transaction.

8. The non-transitory computer-readable storage medium of claim 7, wherein the client device is configured to:
   receive the signed data structure;
   present the one or more transaction details; and
   prompt the user to accept the transaction details by authorizing the second digital signature to be generated over the signed data structure.

9. The non-transitory computer-readable storage medium of claim 7, wherein the data structure further stores a set of network addresses authorized to host a web-application receiving the request from the client device.

10. The non-transitory computer-readable storage medium of claim 7, wherein the operation further comprises, storing the data structure and first digital signature in a transaction history log.

11. The non-transitory computer-readable storage medium of claim 7, wherein the requested transaction is a funds transfer and wherein the one or more transaction details include at least a source account associated with the client device, a recipient account for the funds transfer, and an amount for the funds transfer.

12. The non-transitory computer-readable storage medium of claim 7, wherein the data structure is a PKCS #7 blob.

13. A system, comprising:
a first computing system having at least a processor and a memory hosting a web-application, wherein the web application is configured to perform an operation, comprising:
   receiving, over a network connection, a request from a client device to perform a transaction, wherein the request specifies one or more transaction details characterizing the requested transaction,
   generating, by operation of a processor, a data structure storing the transaction details,
   obtaining, from a transaction signings service, a first digital signature over the data structure,
   sending the signed data structure to the requesting client device,
   receiving, from the client device, the signed data structure, wherein the signed data structure received from the client device is wrapped with a second digital signature and wherein the second digital signature is generated by the client device,
   validating the data structure, of the signed data structure received from the client device, against the first digital signature, and
   validating the signed data structure received from the client device against the second digital signature,
   upon determining the first digital signature and second digital signatures are valid, performing the requested transaction; and
a second computing system having at least a processor and a memory hosting the transaction signing service, wherein the transaction signing service is configured to generate the first digital signature over the data structure.

14. The system of claim 13, wherein the client device is configured to:
   receive the signed data structure;
   present the one or more transaction details; and
   prompt the user to accept the transaction details by authorizing the second digital signature to be generated over the signed data structure.

15. The system of claim 13, wherein the data structure further stores a set of network addresses authorized to host a web-application receiving the request from the client device.

16. The system of claim 13, wherein the operation further comprises, storing the data structure and first digital signature in a transaction history log.

17. The system of claim 13, wherein the requested transaction is a funds transfer and wherein the one or more transaction details include at least a source account associated with the client, a recipient account for the funds transfer and an amount for the funds transfer.

18. The system of claim 13, wherein the data structure is a PKCS #7 blob.

* * * * *